Patented Apr. 30, 1929.

1,710,722

UNITED STATES PATENT OFFICE.

OSCAR A. CHERRY AND FRANZ KURATH, OF CHICAGO, ILLINOIS, ASSIGNORS TO ECONOMY FUSE AND MANUFACTURING COMPANY, OF CHICAGO, ILLINOIS, A CORPORATION OF NEW YORK.

METHOD OF PRODUCING PHENOLIC CONDENSATION PRODUCTS.

No Drawing. Application filed April 21, 1926. Serial No. 103,620.

The present invention relates to methods of producing phenolic condensation products.

It has been proposed to produce potentially reactive phenolic condensation products by causing a phenolic body to combine with such a proportion of formaldehyde or other methylene containing substance that a fusible resin results, after which furfuramide is added to harden said resin. It has been proposed to mix this potentially reactive resin with a filler and subject the mass to heat and pressure to produce a molded product. Tests have revealed the fact that said process is open to very serious objections. It has also been found that when an acid such as oxalic acid or a base such as caustic soda is used as the condensing agent to form the fusible resin, furfuramide reacts with the resin only very slowly and does not produce the strengths which are required for commercial purposes.

An object of the present invention is to provide a method applicable either to the one-step process or to the two-step process for producing phenolic condensation products, which method will produce a resin which is very well adapted for subsequent molding operations.

A further object is to provide a composition of matter which is well adapted for molding.

According to the present invention a phenolic body is treated with formaldehyde or other methylene containing substance, the proportion of formaldehyde or other methylene containing substance being limited below the amount required for complete reaction, said treatment being carried on in the presence of furfuramide or a mixture of furfural and an ammonia producing substance, as for example hexamethylenetetramine or aqueous ammonia.

According to one aspect of the present invention, a fusible resin is formed by boiling a phenolic body and formaldehyde or other methylene containing substance in the presence of furfuramide, or the equivalent of furfuramide, until substantially all of the formaldehyde has combined with the phenolic body and a viscous, resinous substance is formed. Referring to figures for the purpose of illustration, the improved process may be carried out by boiling under a reflux condenser 200 parts of phenolic body and 130 parts of commercial formaldehyde in the presence of furfuramide, (usually from 10 to 25 parts), until substantially all of the formaldehyde has combined with the phenolic body and a viscous, resinous substance is formed. The supernatent water is eliminated either by decantation or by distillation. The resulting resin is mixed with from 20 to 30 per cent of furfuramide, or its equivalent, to form a potentially reactive product. After admixture with fillers, it may be molded under heat and pressure to form infusible articles possessing greater strength than it has heretofore been possible to obtain when using furfuramide as the hardening agent. Referring to another aspect of the present invention, furfuramide or its equivalent may be used as the condensing agent in the so-called one-step reaction, in which reaction the furfuramide serves not only as a condensing agent but as a hardening agent as well. In so far as applicants are informed, the preparation of a reactive resin containing furfuramide as the hardening agent has not heretofore been possible. Referring to specific figures for purposes of illustration only, the process may be carried out by mixing 200 parts of phenolic body, 130 parts of formaldehyde and 60 parts of furfuramide, and boiling said mixture under a reflux condenser until separation into two layers has occurred and the odor of formaldehyde has substantially disappeared from the supernatent aqueous layer. The aqueous layer is eliminated by decantation, or otherwise, and the potentially reactive resin is thus obtained in a substantially anhydrous condition. When mixed with fillers, the potentially reactive resin formed as immediately above described provides a composition suitable for molding under heat and pressure. Said resin, when unmixed with fillers, is suited for the uses to which phenolic condensation products are ordinarily put.

It will be clear that the proportions of the parts above recited are merely illustrative and are not to be considered in a limiting sense. The proportions of formaldehyde and furfuramide may be varied within large limits. The proportion of formaldehyde should be restricted to such an extent that there is an excess of phenolic body, otherwise the furfuramide will not act as a hardening agent, but merely as a condensing agent. As will be understood by those skilled in the art, furfural and ammonia may be substituted for furfuramide. For example, 200 parts of phenolic body, 130 parts of formaldehyde, 72 parts of furfural and 30 parts of ammonia may be treated as above described to form a potentially reactive resin; or the furfural may be used in slight excess of that required for combining with the ammonia without producing deleterious effects.

What is claimed is:

1. The method of producing a phenolic condensation product which consists in heat treating a phenolic body and formaldehyde in the presence of furfuramide, while maintaining an excess of phenolic body over that required for combination with said formaldehyde.

2. The process of producing a phenolic condensation product which consists of condensing a phenolic body with a reactive methylene containing substance in the presence of furfuramide, while maintaining an excess of phenolic body over that necessary for complete combination with said methylene containing substance.

3. The method of preparing a phenolic condensation product which consists of condensing in the presence of furfuramide a combination of phenolic body and a reactive methylene containing substance while maintaining an excess of phenolic body over that necessary for complete combination with said methylene containing substance, and hardening the resulting product with furfuramide.

4. The method of producing a phenolic condensation product which consists of heat treating a phenolic body with a reactive methylene containing substance in the presence of furfuramide, the proportions being such that said methylene containing substance will combine with said phenolic body leaving an excess of phenolic body, and such that said furfuramide will react upon the product resulting from the reaction of said phenolic body and said methylene containing substance, and such that said furfuramide will act upon the excess of phenolic body.

5. The method of producing a phenolic condensation product which consists in heat treating a phenolic body with a reactive methylene containing substance in the presence of furfuramide, the proportions of said substances being such that said methylene containing substance will combine with said phenolic body leaving an excess of phenolic body, discontinuing said heat treatment when all of said methylene containing substance has combined with said phenolic body to form a fusible resin, freeing said resin from water, and further heat treating said resin to harden same.

6. The method of producing a phenolic condensation product which consists in heat treating a mixture of a phenolic body, a reactive methylene containing substance and furfuramide, in which mixture the phenolic body is in excess over that necessary to combine with all of said methylene containing substance.

7. The method of producing a phenolic condensation product which consists of heat treating a phenolic body with a reactive methylene containing substance in the presence of furfuramide, the proportions being such that said methylene containing substance will combine with said phenolic body leaving an excess of phenolic body, and thereafter heat treating the resulting product with furfuramide to harden same.

8. A composition of matter containing furfuramide and the resultant of the heat treatment of a mixture of a phenolic body, a reactive methylene containing substance and furfuramide, in which mixture said phenolic body is in excess of the amount necessary for combination with said methylene containing substance.

Signed at Chicago, Illinois, this 9th day of April, 1926.

OSCAR A. CHERRY.
FRANZ KURATH.